US012641259B2

(12) United States Patent
Urban et al.

(10) Patent No.: US 12,641,259 B2
(45) Date of Patent: May 26, 2026

(54) ALF APSS FOR MULTILAYER CODING AND DECODING

(71) Applicant: INTERDIGITAL CE PATENT HOLDINGS, SAS, Paris (FR)

(72) Inventors: Fabrice Urban, Thorigne Fouillard (FR); Philippe De Lagrange, Betton (FR); Philippe Bordes, Laille (FR); Franck Hiron, Chateaubourg (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/700,291

(22) PCT Filed: Oct. 11, 2022

(86) PCT No.: PCT/EP2022/078264
§ 371 (c)(1),
(2) Date: Apr. 11, 2024

(87) PCT Pub. No.: WO2023/062014
PCT Pub. Date: Apr. 20, 2023

(65) Prior Publication Data
US 2025/0317584 A1 Oct. 9, 2025

(30) Foreign Application Priority Data
Oct. 14, 2021 (EP) ..................................... 21306436

(51) Int. Cl.
*H04N 19/187* (2014.01)
*H04N 19/117* (2014.01)
(Continued)

(52) U.S. Cl.
CPC ......... *H04N 19/187* (2014.11); *H04N 19/117* (2014.11); *H04N 19/119* (2014.11); *H04N 19/176* (2014.11); *H04N 19/70* (2014.11)

(58) Field of Classification Search
CPC .. H04N 19/187; H04N 19/117; H04N 19/119; H04N 19/176; H04N 19/70
See application file for complete search history.

(56) References Cited

U.S. PATENT DOCUMENTS

2020/0344473 A1 10/2020 Seregin et al.
2023/0058538 A1* 2/2023 Deng ................... H04N 19/176
(Continued)

FOREIGN PATENT DOCUMENTS

WO 2018129168 7/2018

OTHER PUBLICATIONS

Chubach et al., AHG9: On Inter-Layer Referencing of ALF, 17. JVET Meeting, Jan. 7, 2020-Jan. 17, 2020, Brussels, The Joint Video Exploration Team of ISO/IEC JTC1/SC29/WG11 and ITU-T SG.16, No. JVET-Q0170-v1, m51759, (2019).
(Continued)

*Primary Examiner* — Richard T Torrente
(74) *Attorney, Agent, or Firm* — Ronald Kolczynski

(57) ABSTRACT

A restricted syntax range per layer in a multi-layer video coding scheme prevents inter-layer conflicts. In one embodiment, adaptive loop filtering sets defined in an adaptive parameter set are distinct in the multiple layers. In another embodiment, a layer identification is also used to uniquely identify the adaptation parameter set. In a related embodiment, a high-level syntax flag indicates whether a layer is independent of other layers.

20 Claims, 14 Drawing Sheets

(51) Int. Cl.
| | |
|---|---|
| *H04N 19/119* | (2014.01) |
| *H04N 19/176* | (2014.01) |
| *H04N 19/70* | (2014.01) |

(56) References Cited

U.S. PATENT DOCUMENTS

| | | | | |
|---|---|---|---|---|
| 2024/0146973 A1* | 5/2024 | Deng | .................... | H04N 19/157 |
| 2024/0291981 A1* | 8/2024 | Zare | ..................... | H04N 19/174 |

OTHER PUBLICATIONS

Zare et al., AHG10: VTM Encoder Changes for ALF Usage With Subpicture, 24. JVET Meeting, Oct. 6, 2021-Oct. 15, 2021, Teleconference, The Joint Video Exploration Team of ISO/IEC JTC1/SC29/WG11 and ITU-T SG.16, No. JVET-X0143-v04, m57944, (2021).

Bross et al., Versatile Video Coding Editorial Refinements on Draft 10, Joint Video Experts Team (JVET) of ITU-T SG 16 WP3 and ISO/IEC JTC 1/SC29, 20th Meeting, by teleconference, Oct. 7-16, 2020, Document: JVET-T2001-v1.

* cited by examiner

900

Start ⎯ 901

Assigning Ranges of Values to a Syntax Element per Layer ⎯ 910

Encoding Multiple Layers of Video Using Assigned Range Values ⎯ 920

1000

Start ——1001

Determining Ranges of Values of a Syntax Element per Layer ——1010

Decoding Multiple Layers of Video Using Determined Range Values ——1020

1100

ALF APSS FOR MULTILAYER CODING AND DECODING

CROSS REFERENCE TO RELATED APPLICATIONS

This application is a U.S. National Stage Application under 35 U.S.C. 371 of International Patent Application No. PCT/EP2022/078264, filed Oct. 11, 2022, which is incorporated herein by reference in its entirety.

This application claims the benefit of European Application Nos. 21306436.3, filed Oct. 14, 2021, which is incorporated herein by reference in its entirety.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. Versatile Video Coding (VVC) is a video coding standard used for compression of video sequences.

SUMMARY

At least one of the present embodiments generally relates to a method or an apparatus for video encoding or decoding, and more particularly, to a method or an apparatus for using Adaptation Parameter Sets (APS) for Adaptive Loop Filters (ALF) in multilayer coding, as in the VVC (Versatile Video Coding or H.266) standard.

According to a first aspect, there is provided a method. The method comprises steps for assigning ranges of values to a syntax element corresponding to multiple layers comprising video data; and encoding the multiple layers of video data using said assigned ranges of values.

According to a second aspect, there is provided a method. The method comprises steps for determining ranges of values of a syntax element corresponding to multiple layers comprising video data; and decoding the multiple layers of video data using said determined ranges of values.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and generally relate to video compression and video encoding and decoding more specifically using Adaptive Loop Filter (ALF) Adaptation Parameter Sets (APS) for multilayer coding and decoding.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

VVC enables multi-layer encoding, with a multi-layered profile, for scalability, Multiview or 360° use cases. Each layer, corresponding to a source, is coded separately or with inter-layer dependency, and then the bitstream is merged into a single bitstream, with layer information.

Figure 1:
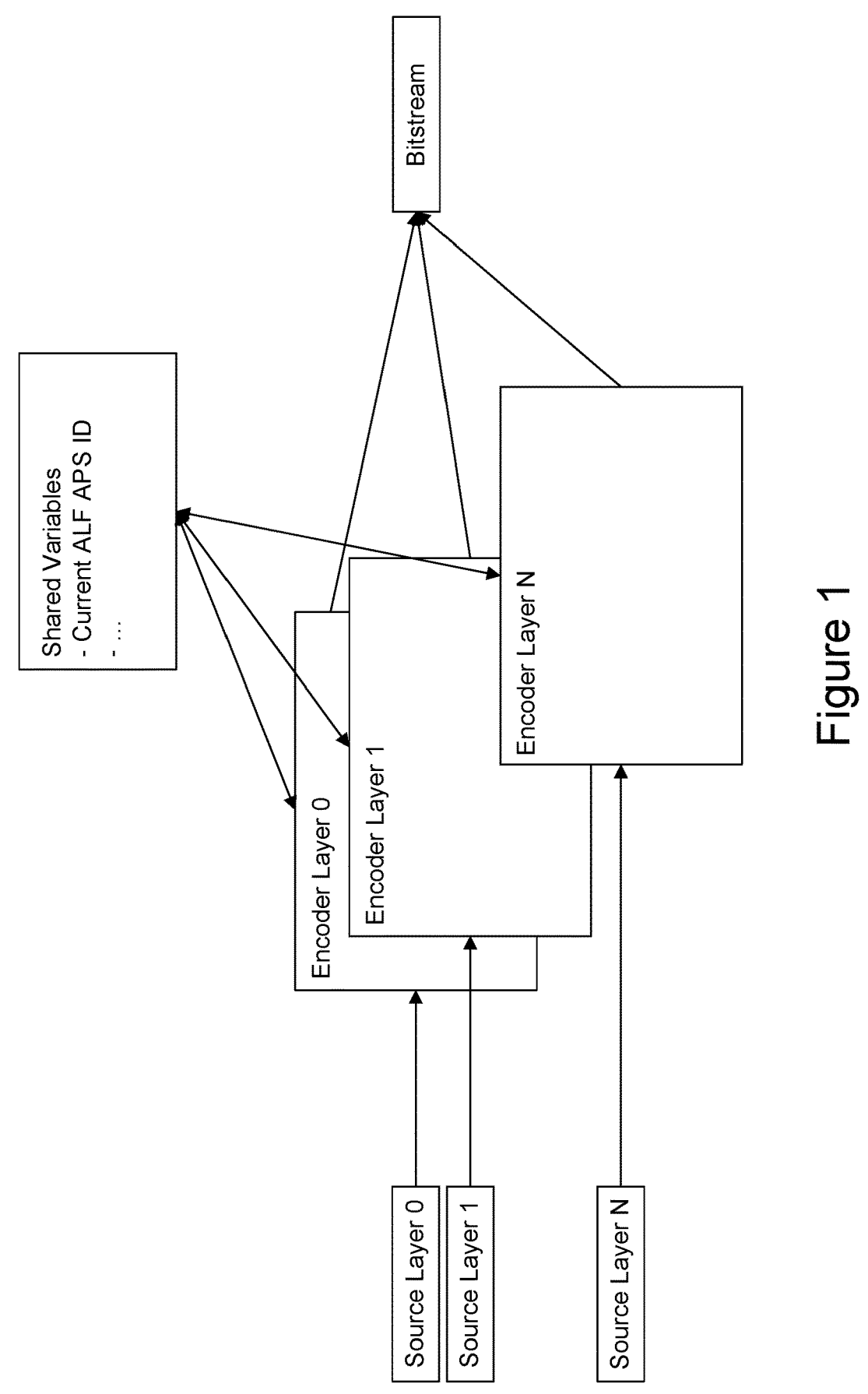
FIG. 1 illustrates an overview of a multi-layer VTM encoder.

FIG. 1 shows the multi-layer implementation overview of VTM (Versatile Test Model). A separate encoder instance is created for each layer. Each layered encoder encodes its source (for example in a spatial scalability use-case, each source corresponds to the same video sequence at a different resolution). Inter-layer prediction is possible. For each picture, the layered encoder processes are launched sequentially, starting from the lowest layer ID. The encoders share layer-independent variables such as APS IDs. For every picture, the output bitstreams are multiplexed into a common bitstream, with their corresponding layer ID (IDentification number) information signaled at the NAL (Network Abstraction Layer) unit header for example.

In VVC, there are 4 in-loop filters: luma-mapping chroma scaling (LMCS), deblocking filter (DBF), sample adaptive offset (SAO) and ALF (Adaptive Loop Filter). The in-loop ALF filter is a linear filter whose purpose is to reduce distortion compared to original pictures.

The coefficients "$c_n$" of the ALF filter are determined so that to minimize the mean square error between original samples "$s(r)$" and filtered samples "$t(r)$" by using Wiener-based adaptive filter technique.

$$f(r) = \sum_{n=0}^{N-1} c_n \cdot t(r + p_n) \qquad \text{(eq. 2)}$$

where:

$r=(x,y)$ is the sample location belongs to the to-be-filtered region "R".

Original sample: $s(r)$

To-be-filtered sample: $t(r)$

FIR filter with N coefficients: $c=[c_0, \ldots c_{N-1}]$

Filter tap position offset: $\{p_0, p_1, \ldots p_{N-1}\}$, where $p_n$ denotes the sample location offset to r of the $n^{th}$ filter tap. In the following we will also name the set of tap positions the filter "shape".

Filtered sample: $f(r)$

To find the minimum sum of squared errors (SSE) between $s(r)$ and $f(r)$, let the derivatives of SSE with respect to on be equal to zero. Then the coefficient values "c" are obtained by solving the following equation (320, 330):

$$[Tc] \cdot c^T = v^T \qquad \text{(eq. 3)}$$

where:

$$[Tc] = \begin{bmatrix} \sum_R t(r+p_0) \cdot t(r+p_0) & \sum_R t(r+p_1) \cdot t(r+p_0) & \cdots & \sum_R t(r+p_{N-1}) \cdot t(r+p_0) \\ \sum_R t(r+p_0) \cdot t(r+p_1) & \sum_R t(r+p_1) \cdot t(r+p_1) & \cdots & \sum_R t(r+p_{N-1}) \cdot t(r+p_1) \\ \cdots & \cdots & \cdots & \cdots \\ \sum_R t(r+p_0) \cdot t(r+p_{N-1}) & \sum_R t(r+p_1) \cdot t(r+p_{N-1}) & \cdots & \sum_R t(r+p_{N-1}) \cdot t(r+p_{N-1}) \end{bmatrix}$$

-continued $$[v] = \begin{bmatrix} \sum_R s(r) \cdot t(r + p_0) \\ \sum_R s(r) \cdot t(r + p_1) \\ \vdots \\ \sum_R s(r) \cdot t(r + p_{N-1}) \end{bmatrix}$$

In VVC (Versatile Video Coding), the reconstructed luma samples "$t(r)$" are classified (310) into K classes (K=25 for luma samples, K=1 for chroma samples) and K different filters are determined with the samples of each class. The classification is made with Directionality and Activity values derived with local gradients.

In VVC, the coefficients of the ALF may be coded in the bitstream so that they can be dynamically adapted to the video content. There are also some default coefficients. The encoder selects and indicates which set of coefficients to be used per CTU (Coding Tree Unit) (340).

Figure 2:
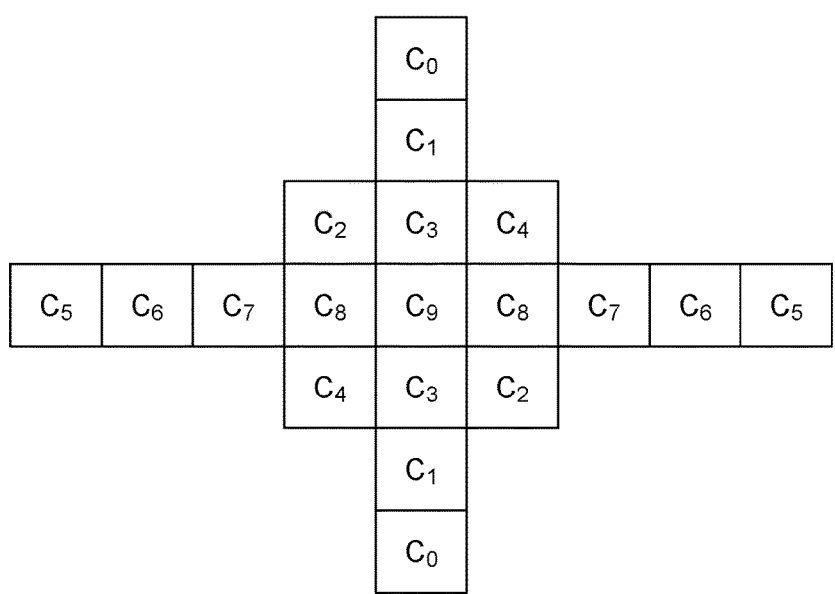
FIG. 2 illustrates a symmetrical filter (left) and filter rotation (right).
Figure 2:
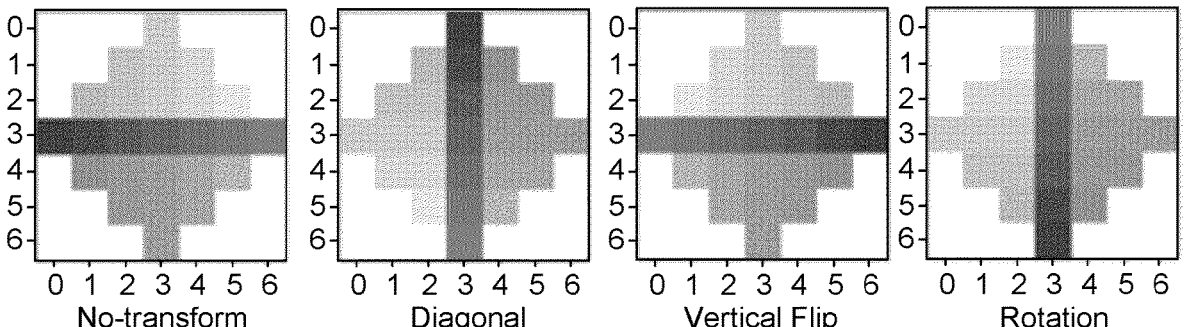

In VVC, symmetrical filters are used, and some filters may be obtained from other filters by rotation (FIG. 2).

In VVC, there are 16 fixed filter sets with hardcoded coefficients, in addition to estimated filters that are stored in APS.

Figure 3:
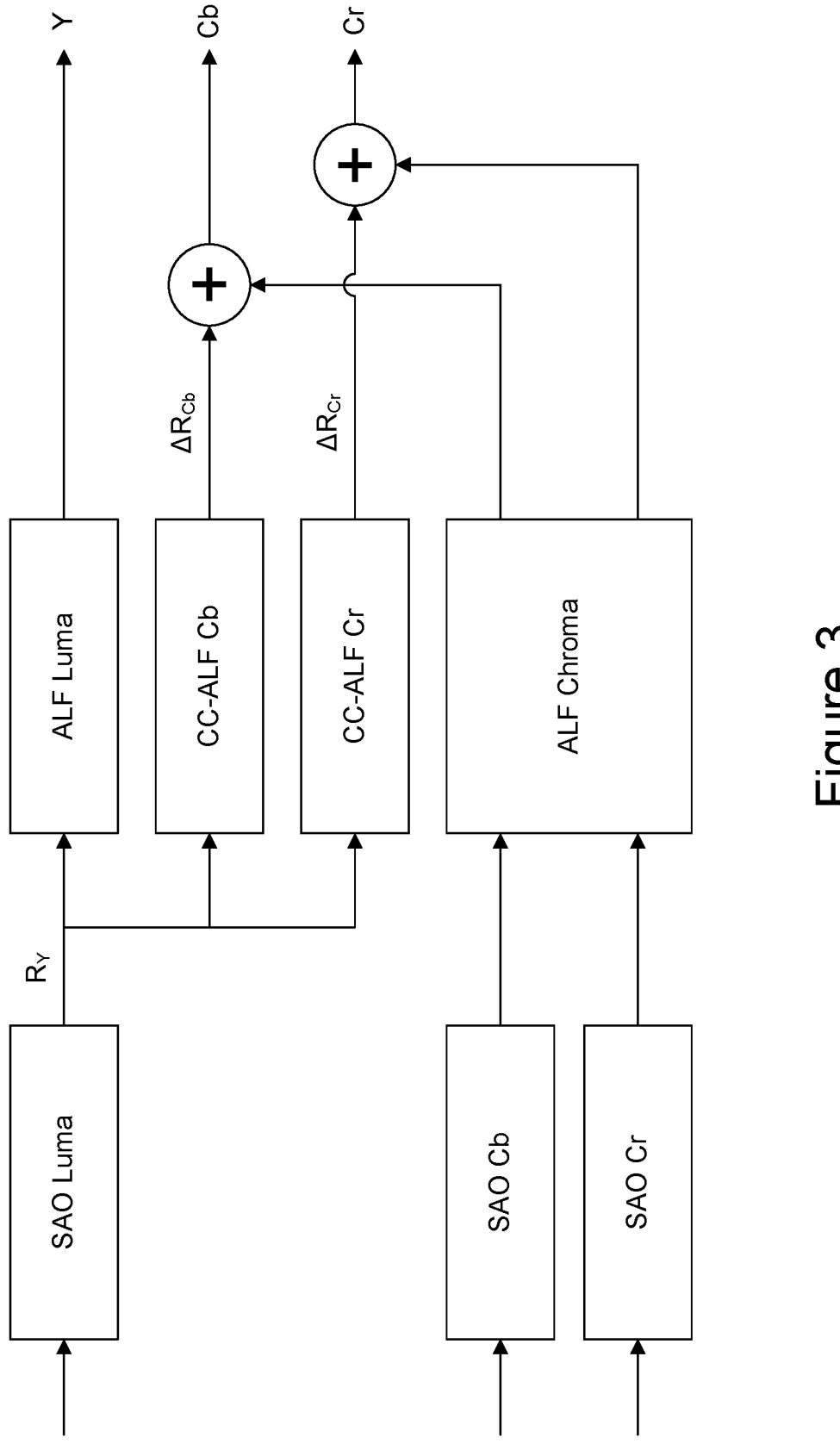
FIG. 3 illustrates ALF and CC-ALF filters.

An additional cross-component filter (CC-ALF) may correct chroma samples (FIG. 3). The correction is made as a linear combination of co-located reconstructed luma samples. In (eq. 2, 3), the values of $s(r)$ are the target (original) chroma sample values, $t(r)$ are luma sample values and $f(r)$ is the chroma correction.

Figure 4:
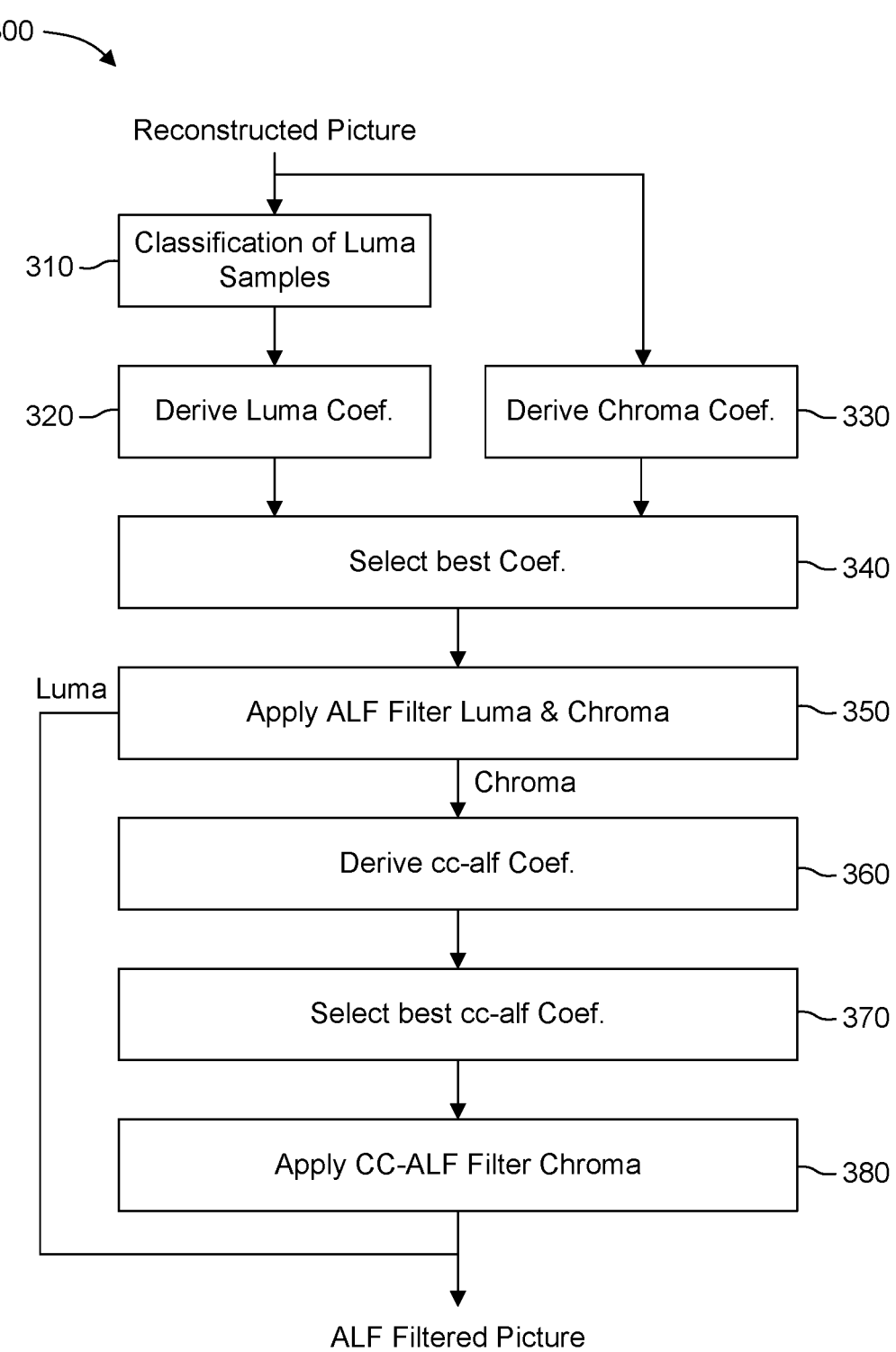
FIG. 4 illustrates overall ALF and CC-ALF process.
Figure 5:
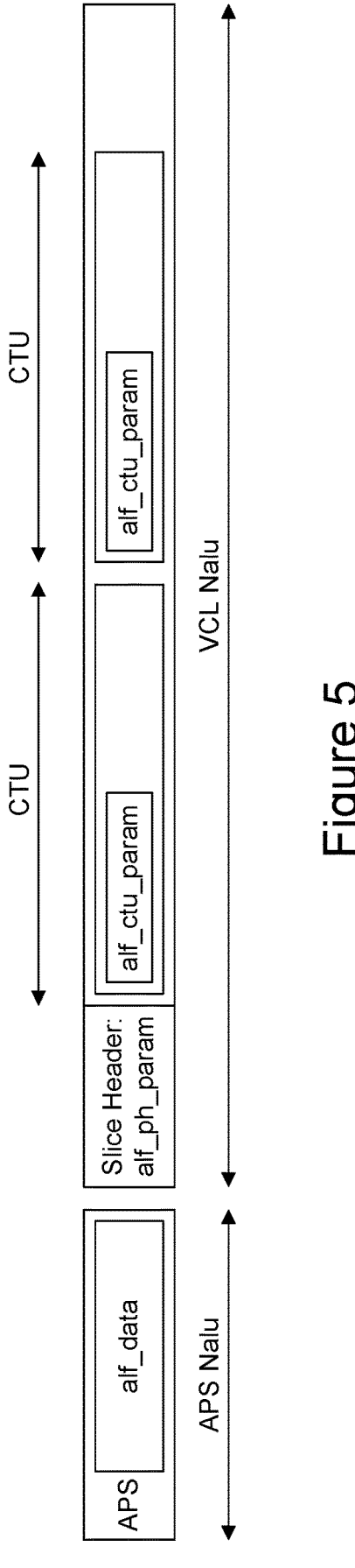
FIG. 5 illustrates an example structure of a bitstream.

The overall ALF (Adaptive Loop Filter) and CC-ALF (Cross Component ALF) encoder process is depicted in FIG. 4. Based on the reconstructed image, luma samples are first classified (310), then ALF filter coefficients are derived (320). Chroma coefficients are also derived (330). Then the best coefficient set is selected per CTU (340) and applied to Luma and Chroma components (350). CC-ALF is then run with the derivation of CC-ALF coefficients (360), selection of best coefficient set per CTU (370) and their application (380). Then the filtered picture is obtained.

For a given picture, the ALF coefficients may be coded in one APS NAL unit. There is a constraint that the content of the ALF APS with a given ID for the same picture must be the same even if there are multiple APSs with the same ID (for example where the picture is divided in multiple sub-pictures). At the CTU level, the ALF coefficients may be retrieved from previous APS or from some defaults. The ALF process is carried out on a CTU-basis. The ALF parameters are three-fold:

Alf_ph_param: in picture or slice header. Comprises five flags indicating whether ALF and CC-ALF are activated for each component: sh_alf_enabled[i=0,1,2], sh_alf_cc_cb_enabled_flag, sh_alf_cc_cr_enabled_flag, and APS identification: number of APS IDs used, APS ID for each used APS, and similar signaling for chroma.

Alf_aps_param: In APS: some ALF and CC-ALF coefficient filters are coded: alf_data( )

Alf_ctu_param: for each CTU, in the CTU header (coded picture), it is signaled per component:

if ALF is enabled: alf_ctb_flag[i=0,1,2][ctu].

and if yes, which filter index to use for each component: alf_luma_fixed_filter_idx(luma), alf_ctb_filter_alt_idx[0,1][ctu], alf_ctb_cc_cb_idc[ctu], alf_ctb_cc_cr_idc[ctu]

In VVC, the Alf_ph_param and Alf_aps_param use variable length coding (VLC) coding, whereas Alf_ctu_param uses entropy coding (CABAC).

Lowest filter indexes [0, 15] refer to the fixed filters, whereas higher indexes [16, 23] refer to estimated filters stored in APSs. The APS IDs that are used are signaled in a slice header.

For selecting the best coefficients (340), the ALF process can choose between coefficients sets. Each coefficient set is stored in an APS. Coefficients that were used for previously coded frames can be reused if the APS is available.

ALF APSs can be used for a particular picture if:

It has not been overwritten

It is associated to a temporal layer that is lower or equal to the temporal layer of the current picture being coded. Temporal layer depends on the GOP (Group of Pictures) structure that can be hierarchical.

The APS layer ID is less than or equal to layer ID of the current picture and APS layer ID is correctly defined as a reference layer, that is, all OLSs (Output Layer Sets) specified by the VPS (Video Parameter Set) that contain the layer ID of the current picture also contain the APS layer ID.

Figure 6:
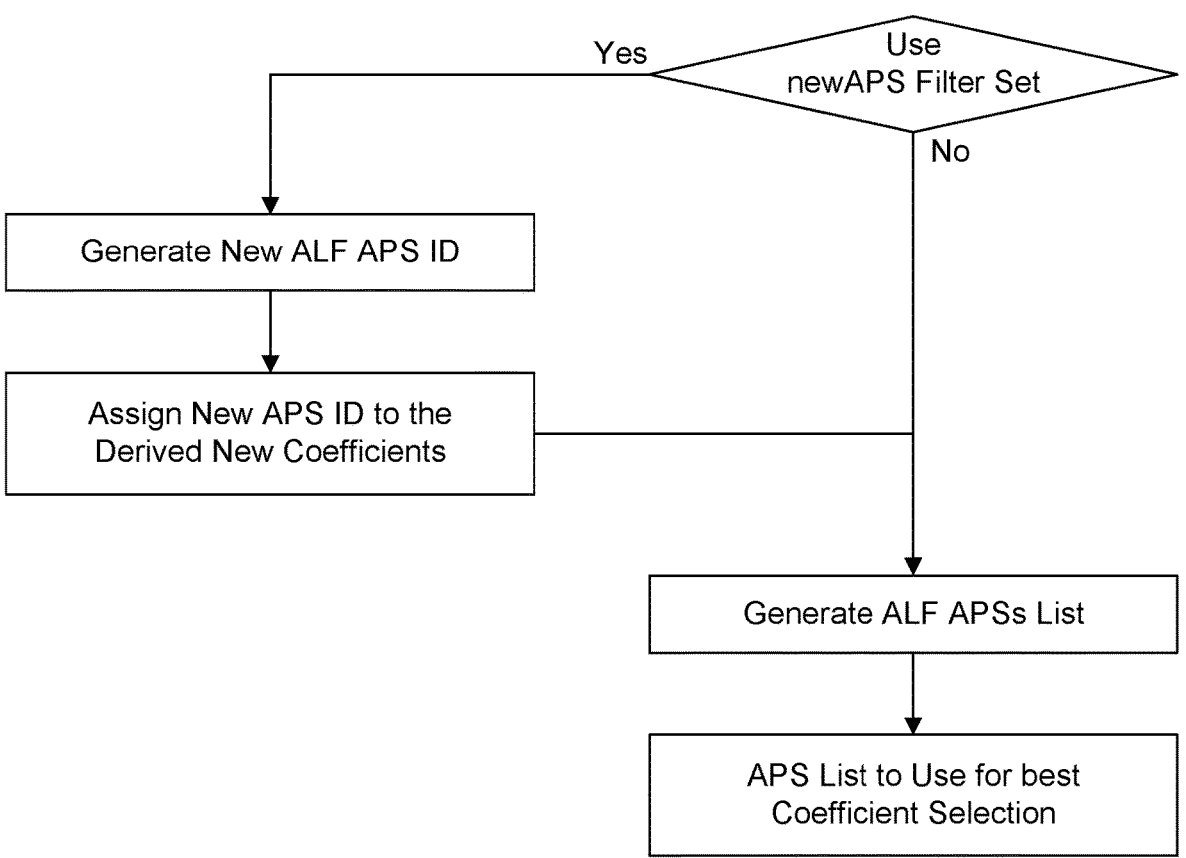
FIG. 6 illustrates an example process for selecting alf_aps_ids to use for a current picture Luma component.

FIG. 6 shows the process for selecting the APS IDs to use for the encoder ALF process. If no new filter set is used, previously defined filter sets stored in previous APSs are used to generate the ALF APSs list. No new ALF APS is transmitted, saving bits but the coefficients might be less optimized for the current picture.

Otherwise, if a new ALF APS is used, the new APS ID into which the ALF coefficients will be stored is generated (the encoder ALF process will compute best coefficients to use with the current picture). For ALS APSs, the ID is in the range 0 to 7 inclusive. The VTM Encoder starts with alf_aps_id 7, and decrements by 1 each time a new ID is required. If the value is negative, it is set to 7 again and the previous APS with same ID is overwritten.

Then, the ALF APS list to use is generated. If a new alf_aps_id is used, then the alf_aps_id must refer to the new estimated coefficients, because previous coefficients that were stored in that APS will be overwritten.

If no new coefficient set is used for Luma component, a spare/free alf_aps_id has still to be available for the chroma ALF encoder, in case a new chroma filters set is used.

Figure 7:
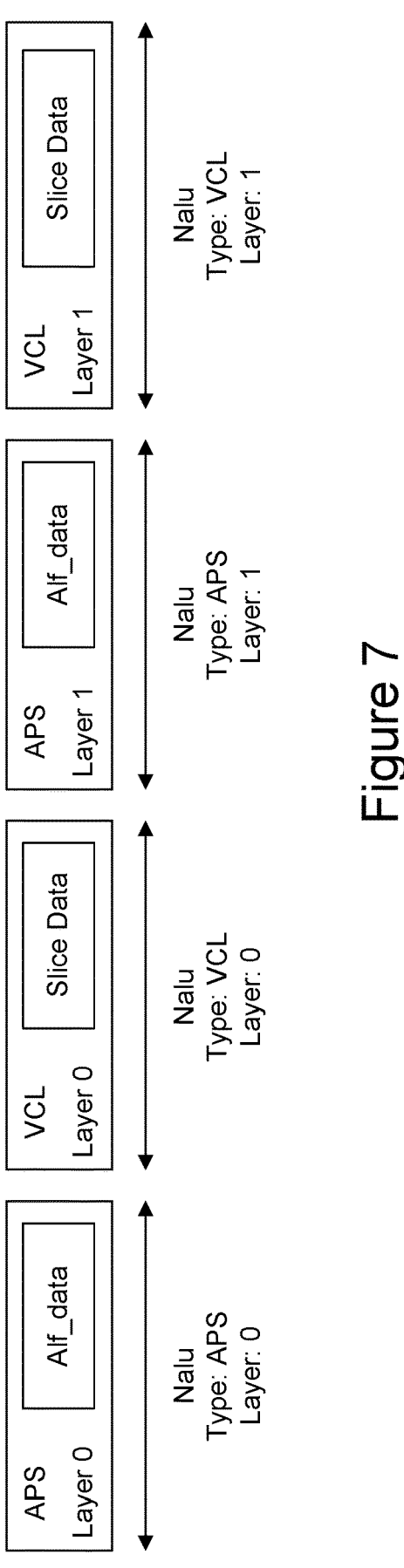
FIG. 7 illustrates an example structure of a multi-layer bitstream.

FIG. 7 shows an example of a multilayer bitstream. The bitstream is divided in NALUs (Network Abstraction Layer Unit), each NALU having several parameters such as Type (APS, VLC, SPS, etc.) and layer.

Subpictures is a tool in VVC to allow subdividing a picture into several rectangular shapes and decoding only some of the subpictures. This tool can be useful for example for coding 360° video content where a large picture can be encoded into several subpictures in parallel using multiple encoders, the streams can be partially multiplexed depending on what the decoder needs, and the decoder decodes only subpictures appearing in the viewport that is shown to the viewer. In this context, because for a given picture APSs with the same ID must have the same content, the encoders need to communicate with each other to use appropriate APS IDs so that they use the same APSs with a given APS ID, or different APS IDs for every subpicture.

In a prior approach, several solutions are proposed to modify the encoder to allow using ALF in this context. The naïve solution is to disable ALF (i.e., both fixed ALF and ALF APS) at the cost of substantial coding efficiency loss. The other solution is to keep the pre-defined fixed ALF enabled, while the ALF APS usage is disabled at the cost of discarding the benefit of parameter adaptation by ALF APS. The more efficient solution in terms of coding efficiency is to enable ALF APS filters, in addition to fixed ALF, in a restricted manner such that any aggregation of sub-bitstreams results in a conformant bitstream without any alf_aps_id identifiers conflict.

In the prior approach, it is proposed that the maximum number of ALF APS allowed in a picture is defined as an encoder configuration parameter. The defined configuration parameter may take a value in the range of {0, . . . , 8}. To manage the allocation of alf_aps_id identifiers to sub-streams which are multiplexed into a single bitstream at the switching points, an offset value to alf_aps_id identifier is defined. The allocation performs in such a manner that a unique range of alf_aps_id identifiers is assigned to each sub-stream.

This solution works for independent encoders using sub-pictures that are multiplexed into a single bitstream.

When using multiple layers for encoding, a single alf_aps_id space is used for all the layers. The ALF encoder for one layer can use alf_aps_ids that the encoder of another layer was using, said another layer encoder not being able to reuse associated ALF coefficients for a next picture and performance of ALF being decreased. This event is more complex in case the picture of one layer may be split into several subpictures.

The general described aspects deal with how the APSs (Adaptive Parameter Set) defining the filters of ALF (Adaptive Loop Filtering) are defined and used in a VVC (Versatile Video Codec) encoder. Specifically, an improvement of the encoder is proposed in a multi-layer context. It is proposed to define and use a restricted alf_aps_id space per layer so that no inter-layer conflict may occur.

Another embodiment (normative) consists in adding the layer_id to uniquely identify the APS.

Per-Layer alf_aps_id Space Constraints

This solution consists in constraining the alf_aps_ids to be limited to certain values depending on the layer. For each layer, a range of alf_aps_ids is defined. If the ranges do not overlap, then no conflict occurs in the encoder ALF process. The per-layer alf_aps_id ranges can overlap, but this would create conflicts.

The solution refers to the process of generating a new alf_aps_id depicted in FIG. 6. For each layer, an encoder is instantiated as shown in FIG. 1. The current alf_aps_id variable is not shared anymore amongst the encoders. Each encoder is instantiated with an alf_aps_id_start and alf_aps_id_end parameters.

If a new ALF APS is used, the new APS ID into which the ALF coefficients will be stored can be generated as follows: the ID is now in the range alf_aps_id_start to alf_aps_id_end inclusive. The encoder starts with alf_aps_id equal to alf_aps_id_end, and decrements by 1 each time a new ID is required. If the value is below alf_aps_id_start, it is set to alf_aps_id_end again. if alf_aps_id_start is higher than alf_aps_id_end, no alf_aps_id can be defined, only fixed filters are used.

alf_aps_id_start and alf_aps_id_end can be defined automatically and optimally as follows:

$$alf\_aps\_id\_start = int\left((i*ALF\_CTB\_MAX\_NUM\_APS)/nb\_layers\right)$$

$$alf\_aps\_id\_end = int\left(((i+1)*ALF\_CTB\_MAX\_NUM\_APS)/nb\_layers\right)$$

with ALF_CTB_MAX_NUM_APS=8 defining the total available alf_aps_id range, nb_layers being the total number of layers to encode, i being the layer index to encode, starting from 0 for the first layer (base layer in a scalable context) and int( ) is the integer part operator that rounds down to the nearest integer.

also be signaled in SPS or PPS, but gated by an entension flag (vps_extension_flag or sps_extension_flag for example).

This high-level syntax flag can also be used for other types of APSs, such as LMCS APSs or scaling matrices APSs.

TABLE 1

| high-level syntax adaptation |
|---|

```
video_parameter_set_rbsp( ) {
    vps_video_parameter_set_id
    vps_max_layers_minus1
    vps_max_sublayers_minus1
    if( vps_max_layers_minus1 > 0 && vps_max_sublayers_minus1 > 0 )
        vps_default_ptl_dpb_hrd_max_tid_flag
    if( vps_max_layers_minus1 > 0 )
        vps_all_independent_layers_flag
    for( I = 0; I <= vps_max_layers_minus1; i++ ) {
        vps_layer_id[ I ]
        if( I > 0 && !vps_all_independent_layers_flag ) {
            vps_independent_layer_flag[ I ]
            if( !vps_independent_layer_flag[ I ] ) {
                vps_max_tid_ref_present_flag[ I ]
                for( j = 0; j < I; j++ ) {
                    vps_direct_ref_layer_flag[ I ][ j ]
                    if( vps_max_tid_ref_present_flag[ I ] && vps_direct_ref_layer_flag[ I ][ j ] )
                        vps_max_tid_il_ref_pics_plus1[ i ][ j ]
                }
            }
        }
    }
if( vps_extension_flag )
{
    if(vps_max_layers_minus1 > 0 && !vps_all_independent_layers_flag ) {
        layer_dependent_aps_flag
    }
}
```

In a variation, alf_aps_id_start and alf_aps_id_end can be defined manually as input configuration parameters.

Using layer_id to Uniquely Identify ALF APS

It is proposed to use the couple (layer_id, alf_aps_id) as an identifier for ALF APSs for multilayer profiles. The alf_aps_id is not sufficient to uniquely identify an APS. Thus, two or more ALF APSs with the same alf_aps_id can coexist if they have different layer_id.

As in the solution above, a current alf_aps_id variable is not shared anymore amongst the encoders, but each encoder instance has its own value, ranging from 0 to ALF_CTB_MAX_NUM_APS=8 as currently in VVC.

Some ALF parameters are changed to implement the changes: Alf_ph_param and Alf_aps_param are unchanged, Alf_ctu_param is changed.

High-Level Syntax

Figure 8:
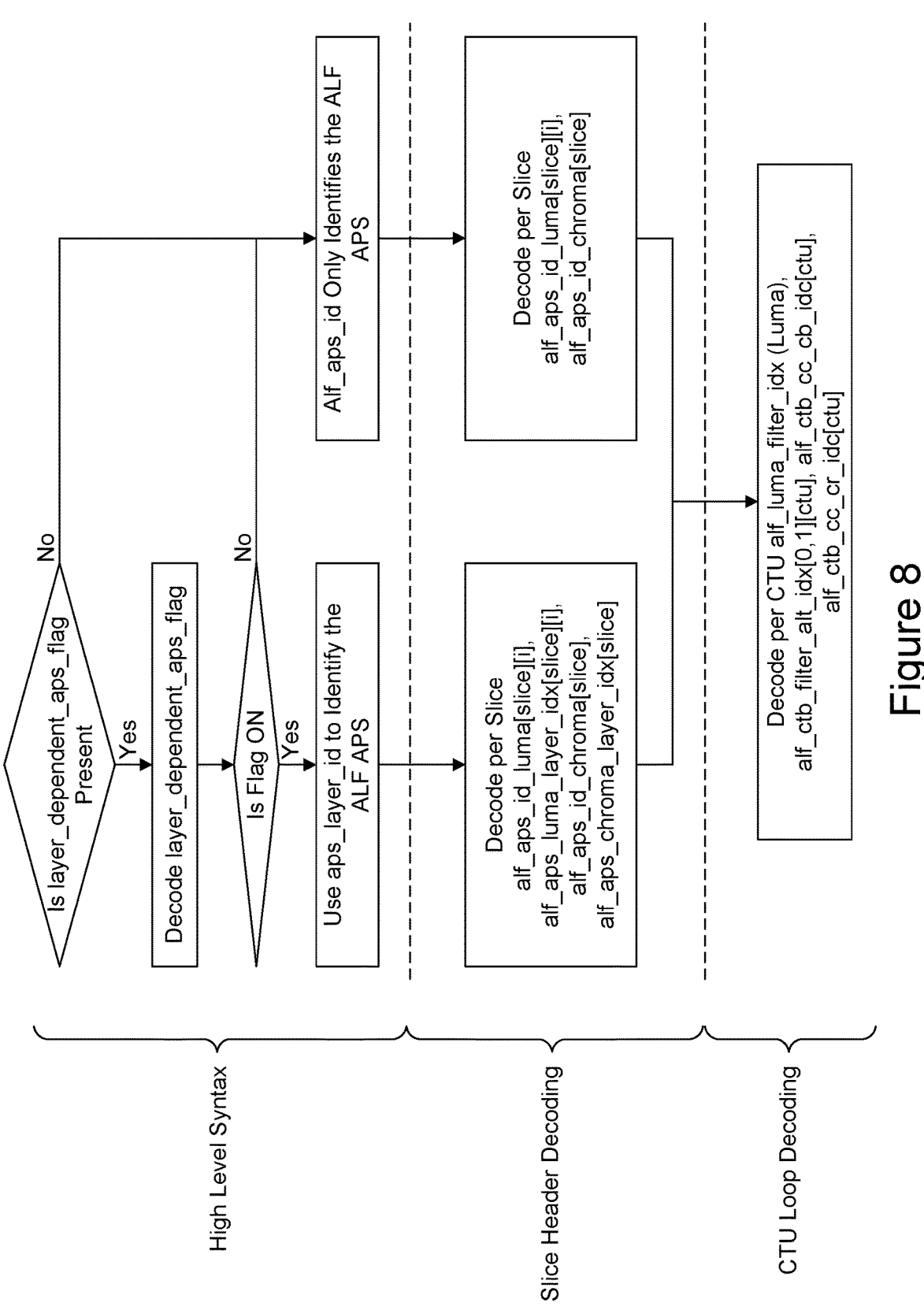
FIG. 8 illustrates an example decoding process of ALF parameters with layer_id as APS identifier.

Either this embodiment can always be enabled, or only if the profile is a multilayer profile. In a variant depicted in FIG. 8, for example, in the VPS (Video Parameter Set) or SPS (Sequence Parameter Set), a high-level syntax flag layer_dependent_aps_flag indicates whether the embodiment is implemented. If the bitstream is a single-layer sequence, layer_dependent_aps_flag should be inferred to false. An example of the added flag in the VPS is given in Table 1. The flag may be used only if an extension flag is enabled (vps_extension_flag), to be used only in a version of VVC greater than version 1 (e.g. VVC v2). vps_extension_flag may be enabled, for example, in VVC v2. The extension flag can also be signaled at SPS. In this case, the layer_dependent_aps_flag would be signaled in SPS, and repeated for each layer. The layer_dependent_aps_flag may Picture or Slice-Level Syntax An identifier is added specifying the layer_id of the ALF APS to identify the ALF filter set to be used. This can be conditioned to the value of a range_extension flag, defined at higher level (VPS or PPS for example), so that it is available only for a future version of VVC for example. Alf_ph_param is signaled as follows for each Slice, in the picture or slice header (coded picture), it is signaled per component if ALF is enabled as illustrated in Table 2:

sh_alf_enabled_flag.

sh_alf_enabled_flag is ON which APSs to derive filter coefficients from: alf_aps_id_luma[i], alf_aps_id_chroma, alf_cc_cb_aps_id alf_cc_cr_aps_id.

if the current picture layer is not independent, which layer_id defines the APSs: alf_aps_luma_layer_idx [i], alf_aps_chroma_layer_idx, alf_cc_cb_aps_chroma_layer_idx, alf_cc_cr_aps_chroma_layer_idx If layer_dependent_aps_flag is false, alf_aps_luma_layer_idx[i], alf_aps_chroma_layer_idx, alf_cc_cb_aps_chroma_layer_idx, alf_cc_cr_aps_chroma_layer_idx are inferred to be equal to the layer_id of the APS.

Otherwise, (the layer is independent) alf_aps_luma_layer_idx[i], alf_aps_chroma_layer_idx, alf_cc_cb_aps_chroma_layer_idx, alf_cc_cr_aps_chroma_layer_idx are inferred to be equal to the layer ID of the current picture.

TABLE 2

Picture or Slice syntax adaptation

```
slice_header( ) {
    if( sps_alf_enabled_flag && !pps_alf_info_in_ph_flag ) {
        sh_alf_enabled_flag
        if( sh_alf_enabled_flag ) {
            sh_num_alf_aps_ids_luma
            for( i = 0; i < sh_num_alf_aps_ids_luma; i++ )
                sh_alf_aps_id_luma[ i ]
                if (range_extension && layer_dependent_aps_flag
    && !vps_independent_layer_flag[slice_layer]) {
                    alf_aps_luma_layer_idx[i]
                }
            if( sps_chroma_format_idc != 0 ) {
                sh_alf_cb_enabled_flag
                sh_alf_cr_enabled_flag
            }
            if( sh_alf_cb_enabled_flag || sh_alf_cr_enabled_flag )
                sh_alf_aps_id_chroma
                if (range_extension && layer_dependent_aps_flag
    && !vps_independent_layer_flag[slice_layer]) {
                    alf_aps_chroma_layer_idx
                }
            if( sps_ccalf_enabled_flag ) {
                sh_alf_cc_cb_enabled_flag
                if( sh_alf_cc_cb_enabled_flag ){
                    sh_alf_cc_cb_aps_id
                    if (range_extension && layer_dependent_aps_flag
    && !vps_independent_layer_flag[slice_layer]) {
                        alf_cc_cb _aps_chroma_layer_idx
                    }
                }
                sh_alf_cc_cr_enabled_flag
                if( sh_alf_cc_cr_enabled_flag ){
                    sh_alf_cc_cr_aps_id
                    if (range_extension && layer_dependent_aps_flag
    && !vps_independent_layer_flag[slice_layer]) {
                        alf_cc_cr _aps_chroma_layer_idx
                    }
                }
            }
        }
    }
}
```

In another embodiment, the ALF filter description data described above can be signaled at a different level. For example, for more flexibility, it can be signaled per CTU or block of a given size independent from a CTU.

Figure 9:
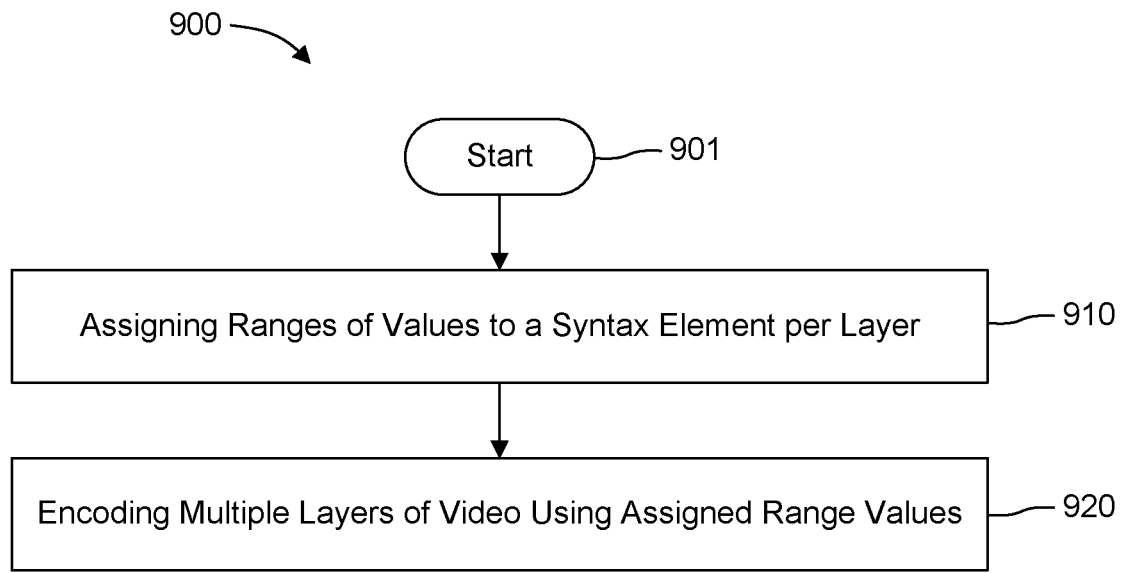
FIG. 9 illustrates. one embodiment of a method under the general described aspects.

One embodiment of a method 900 under the general aspects described here is shown in FIG. 9. The method commences at start block 901 and control proceeds to block 910 for assigning ranges of values to a syntax element corresponding to multiple layers comprising video data. Control proceeds from block 910 to block 920 for encoding the multiple layers of video data using said assigned ranges of values.

Figure 10:
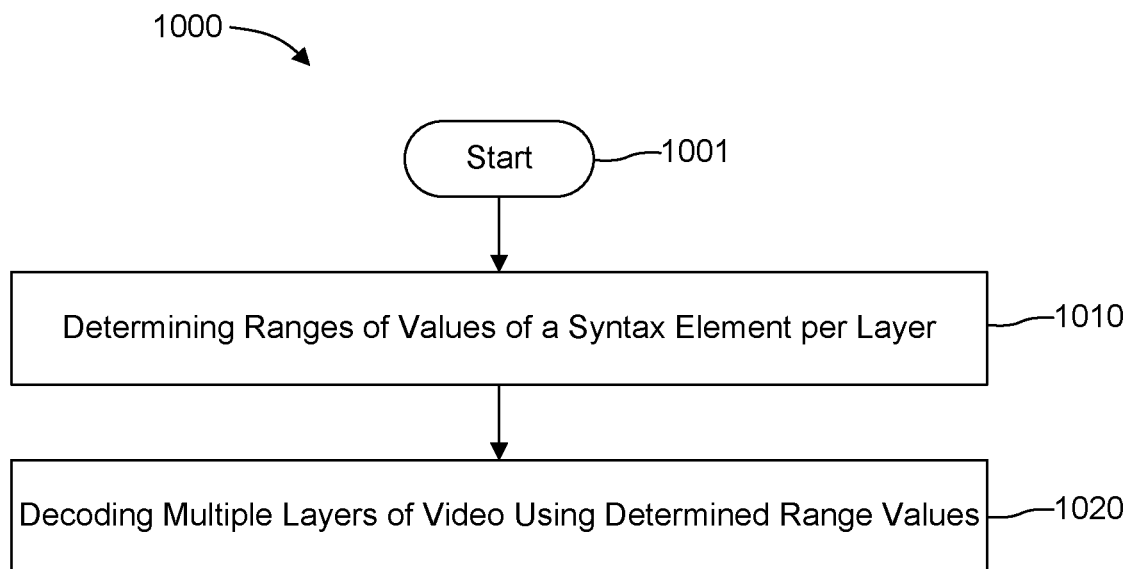
FIG. 10 shows another embodiment of a method under the general described aspects.

One embodiment of a method 1000 under the general aspects described here is shown in FIG. 10. The method commences at start block 1001 and control proceeds to block 1010 for determining ranges of values of a syntax element corresponding to multiple layers comprising video data. Control proceeds from block 1010 to block 1020 for decoding the multiple layers of video data using said determined ranges of values.

Figure 11:
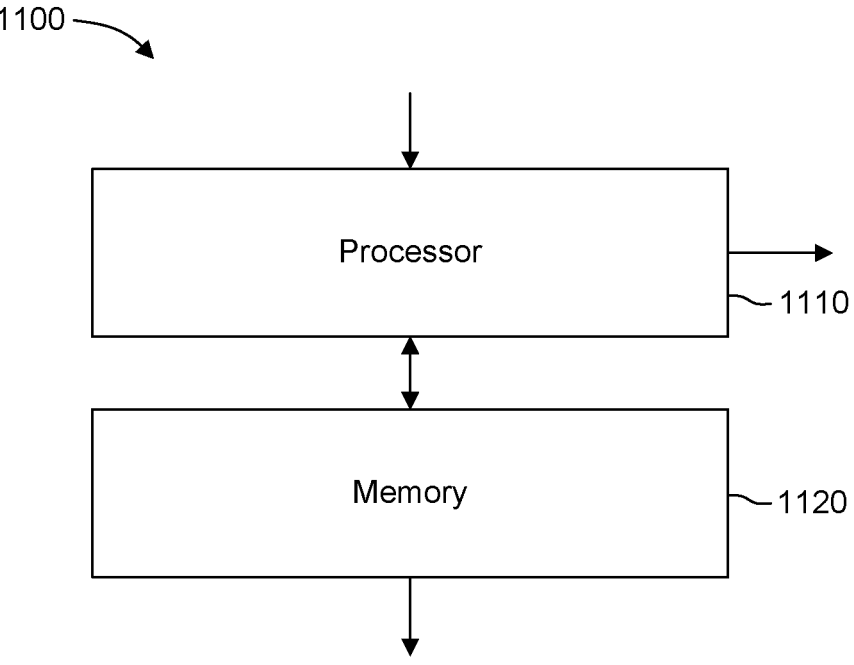
FIG. 11 shows an example apparatus under the described aspects.

FIG. 11 shows one embodiment of an apparatus 1100 for encoding, decoding, compressing or decompressing video data using a restricted range of syntax values per layer in a multi-layer video system to prevent interlayer conflicts. The apparatus comprises Processor 1110 and can be interconnected to a memory 1120 through at least one port. Both Processor 1110 and memory 1120 can also have one or more additional interconnections to external connections.

Processor 1110 is also configured to either insert or receive information in a bitstream and, either compressing, encoding or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 12:
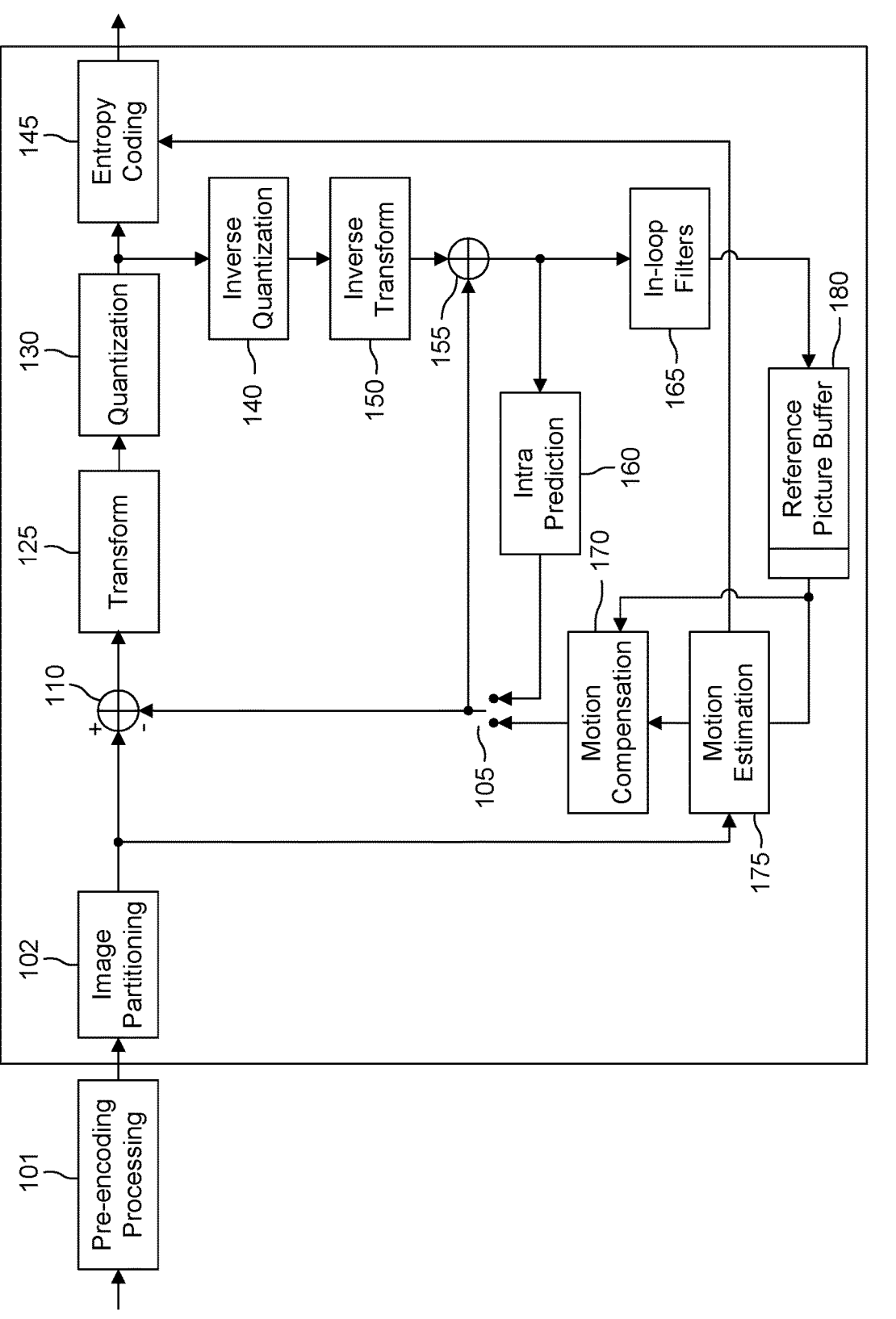
FIG. 12 shows a standard, generic video compression scheme.
Figure 13:
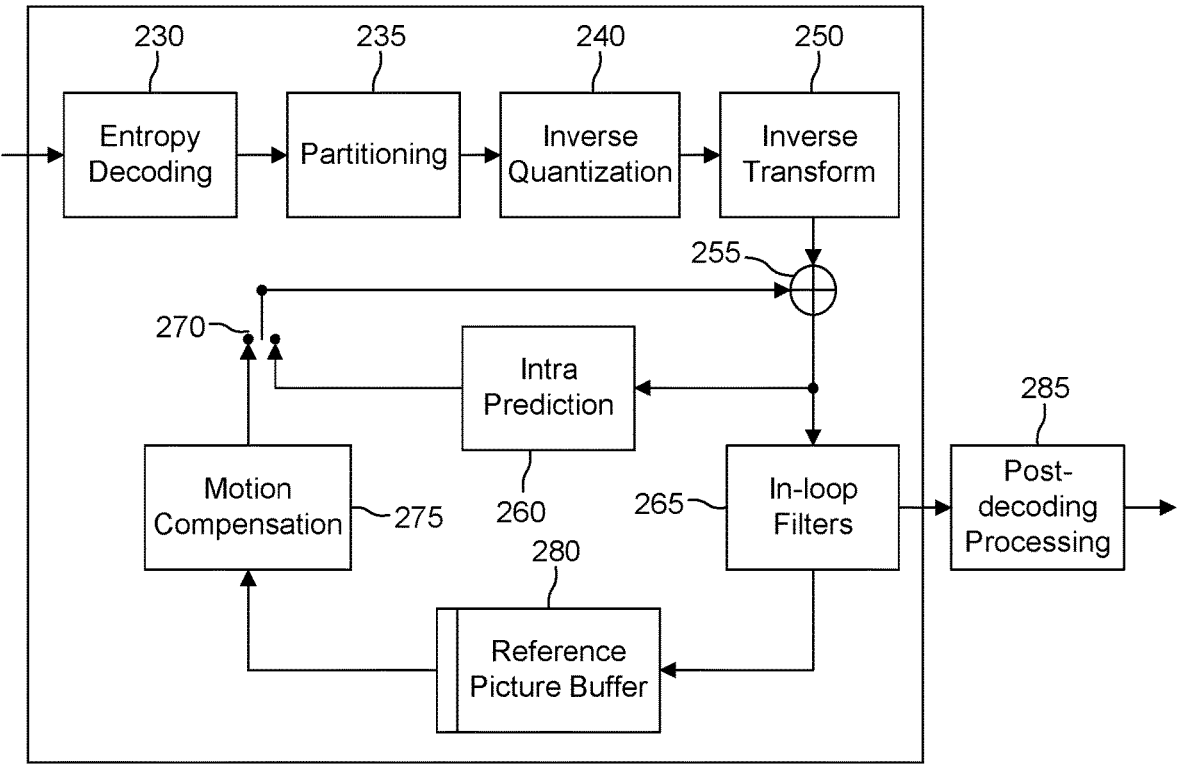
FIG. 13 shows a standard, generic video decompression scheme.
Figure 14:
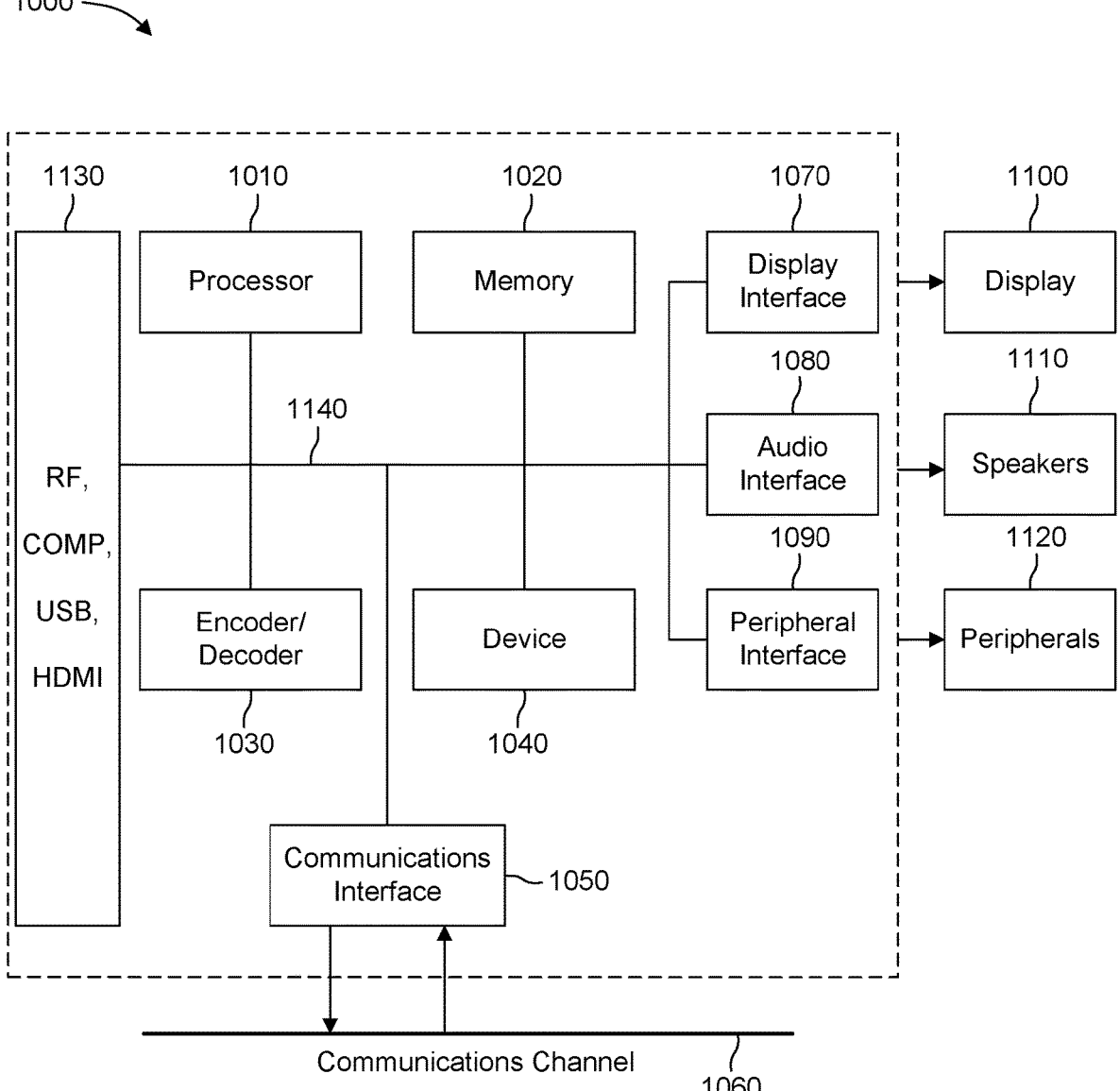
FIG. 14 shows a processor based system for encoding/decoding under the general described aspects.

The aspects described and contemplated in this application can be implemented in many different forms. FIGS. 12, 13, and 14 provide some embodiments, but other embodiments are contemplated and the discussion of FIGS. 12, 13, and 14 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 12 and FIG. 13. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 12 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 13 illustrates a block diagram of a video decoder 200. In the decoder 200, a bitstream is decoded by the decoder elements as described below. Video decoder 200 generally performs a decoding pass reciprocal to the encoding pass as described in FIG. 12. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 14 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 14, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A restricted syntax range per layer in a multi-layer video coding scheme.

Adaptive loop filtering sets defined in an adaptive parameter set are distinct in the multiple layers.

A layer identification used to uniquely identify the adaptation parameter set.

A high-level syntax flag indicating whether adaptive parameter sets are identified by their layer.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
assigning ranges of values to a syntax element used to identify an Adaptive Loop Filter Adaptation Parameter Set (ALF APS), an assigned range being unique to its corresponding layer and non-overlapping with ranges assigned to other layers;
associating each ALF APS with a layer identifier such that an ALF APS is uniquely identified by a combination of the layer identifier and the ALF APS identifier; and,
encoding multiple layers of video data using said assigned ranges of values per-layer and identifiers, wherein said encoding is performed according to a multilayer Versatile Video Coding (VVC) profile signaled by a high-level syntax flag indicative of layer-dependent APS usage.

2. The method of claim 1, wherein a layer identification is used with said syntax element to identify adaptive loop filtering adaptation parameter sets for a layer.

3. The method of claim 1 wherein said syntax element range decrements for every layer added.

4. The method of claim 1, wherein said range of values is defined as input parameters.

5. The method of claim 1, wherein a high-level syntax flag is indicative of whether adaptive parameter sets are identified by their layer.

6. The method of claim 5, wherein the high-level syntax flag is located in a Video Parameter Set or a Sequence Parameter Set.

7. An apparatus, comprising:
a processor, configured to perform:
assigning ranges of values to a syntax element used to identify an Adaptive Loop Filter Adaptation Parameter Set (ALF APS), an assigned range being unique to its corresponding layer and non-overlapping with ranges assigned to other layers;
associating each ALF APS with a layer identifier such that an ALF APS is uniquely identified by a combination of the layer identifier and the ALF APS identifier; and, encoding multiple layers of video data using said assigned ranges of values per-layer and identifiers, wherein said encoding is performed according to a multilayer Versatile Video Coding (VVC) profile signaled by a high-level syntax flag indicative of layer-dependent APS usage.

8. A non-transitory computer readable medium containing data content generated according to the method of claim 1, for playback using a processor.

9. A computer program product comprising instructions which, when the program is executed by a computer, cause the computer to carry out the method of claim 1.

20

10. A device comprising:
an apparatus (method) according to claim 7; and
at least one of (i) an antenna configured to receive a signal, the signal including a video block, (ii) a band limiter configured to limit the signal received to a band of frequencies that includes the video block, and (iii) a display configured to display an output representative of a video block.

11. The apparatus of claim 7, wherein the syntax element is alf_aps_ids.

12. The apparatus of claim 7, wherein an identifier is used to identify the Adaptive Loop Filter set used.

13. The apparatus of claim 7, wherein a layer identification is used with said syntax element to identify adaptive loop filtering adaptation parameter sets for a layer.

14. The apparatus of claim 7, wherein said syntax element range decrements for every layer added.

15. The apparatus of claim 7, wherein said range of values is defined as input parameters.

16. A method, comprising:
determining ranges of values of a syntax element identifying Adaptive Loop Filter Adaptation Parameter Sets (ALF APSs), each range being uniquely associated with a layer;
deriving, based on high-level syntax signaling indicative of layer-dependent APS usage, a mapping between each layer identifier and its corresponding ALF APS identifier range; and,
decoding multiple layers of video data using the determined ranges of values that are layer-specific and have been determined and said mapping, whereby an ALF APS is selected according to both a layer identifier and an APS identifier to prevent inter-layer conflicts.

17. An apparatus, comprising:
a processor, configured to perform:
determining ranges of values of a syntax element identifying Adaptive Loop Filter Adaptation Parameter Sets (ALF APSs), each range being uniquely associated with a layer;
deriving, based on high-level syntax signaling indicative of layer-dependent APS usage, a mapping between each layer identifier and its corresponding ALF APS identifier range; and,
decoding multiple layers of video data using the determined ranges of values that are layer-specific and have been determined and said mapping, whereby an ALF APS is selected according to both a layer identifier and an APS identifier to prevent inter-layer conflicts.

18. The apparatus of claim 17, wherein a high-level syntax flag is indicative of whether adaptive parameter sets are identified by their layer.

19. The apparatus of claim 18, wherein the high-level syntax flag is located in a Video Parameter Set or a Sequence Parameter Set.

20. The apparatus of claim 17, wherein an identifier is used to identify the Adaptive Loop Filter set used.

* * * * *